United States Patent [19]
Ishii et al.

[11] Patent Number: 5,156,713
[45] Date of Patent: Oct. 20, 1992

[54] TIRE BUILDING MACHINE HAVING A CYLINDRICAL MEMBER TRANSFER APPARATUS

[75] Inventors: Ryutaro Ishii; Kichinosuke Nishimoto; Yuzo Kumagai, all of Kodaira, Japan

[73] Assignee: Bridgestone Corporation, Tokyo, Japan

[21] Appl. No.: 780,285

[22] Filed: Oct. 22, 1991

Related U.S. Application Data

[62] Division of Ser. No. 300,881, Jan. 24, 1989.

[30] Foreign Application Priority Data

Jan. 25, 1988 [JP] Japan .................................. 63-14332
May 13, 1988 [JP] Japan ................................ 63-116295

[51] Int. Cl.⁵ ............................................ B29D 30/20
[52] U.S. Cl. .................................... 156/396; 156/111; 156/401; 156/406.2
[58] Field of Search ............... 156/111, 126, 396, 401, 156/406.2

[56] References Cited

U.S. PATENT DOCUMENTS 4,268,330 5/1981 Komatsu et al. ............... 156/396 X
4,529,461 7/1985 Caretta et al. ...................... 156/126
4,990,211 2/1991 Goodfellow ........................ 156/396

Primary Examiner—Geoffrey L. Knable
Attorney, Agent, or Firm—Sughrue, Mion, Zinn, Macpeak & Seas

[57] ABSTRACT

A transfer apparatus for cylindrical members, including a trolley movable toward and away from a forming drum, a pair of movable members movably supported on the trolley, bead holding units mounted on inner ends of the movable members for holding beads, grasping units mounted on outer ends of the movable members for grasping axial ends of a cylindrical member on its outside, respectively, and toward and away driving units for moving the movable members equal distances toward and away from each other. With the arrangement, if sizes of tires to be produced are changed, bead set positions and grasping positions of the cylindrical member can be easily changed with high efficiency. Even if a cylindrical member has a low rigidity, it can be grasped and transferred with little deformation of the cylindrical member. A tire building machine includes such a transfer apparatus can make easy the labor of operators and improve the working efficiency and further achieves the saving energy and the improvement of formed accuracy.

7 Claims, 13 Drawing Sheets

FIG_3
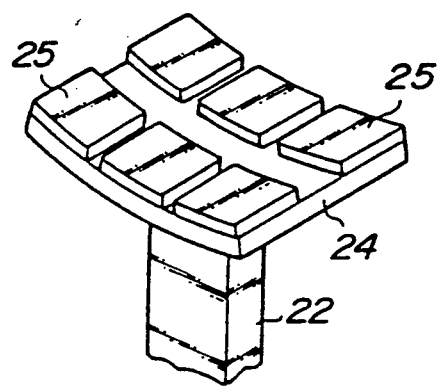
FIG_4
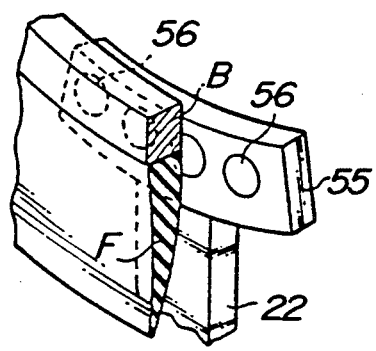

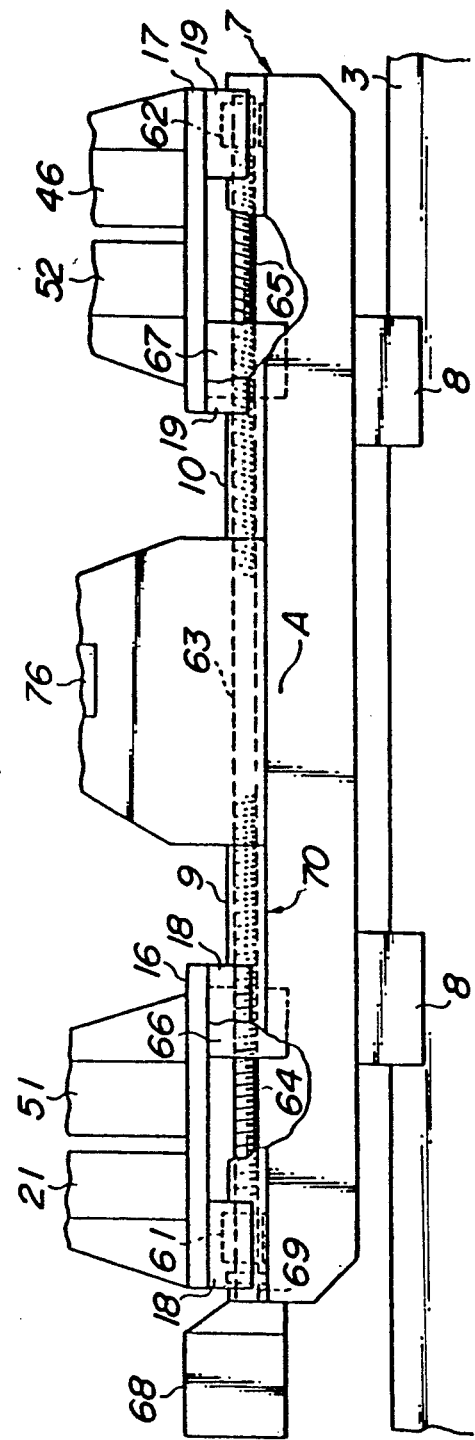

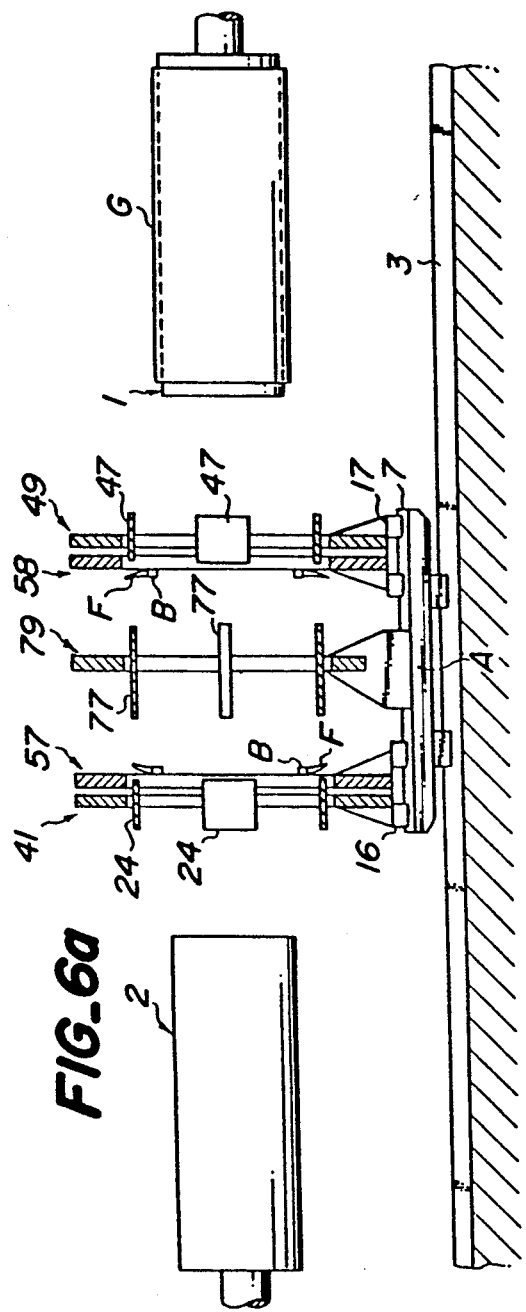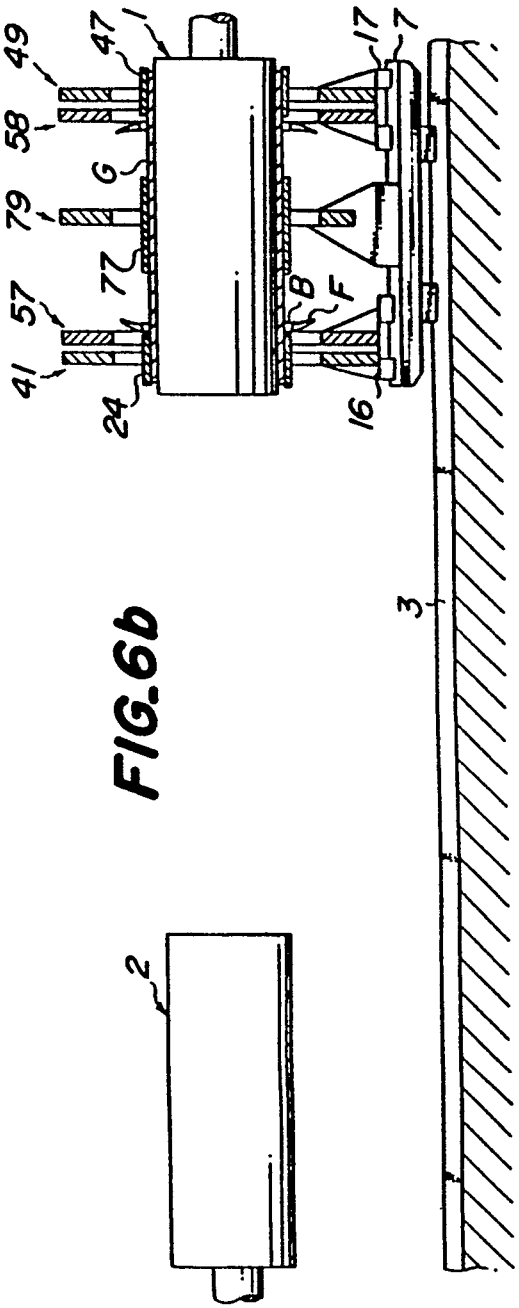

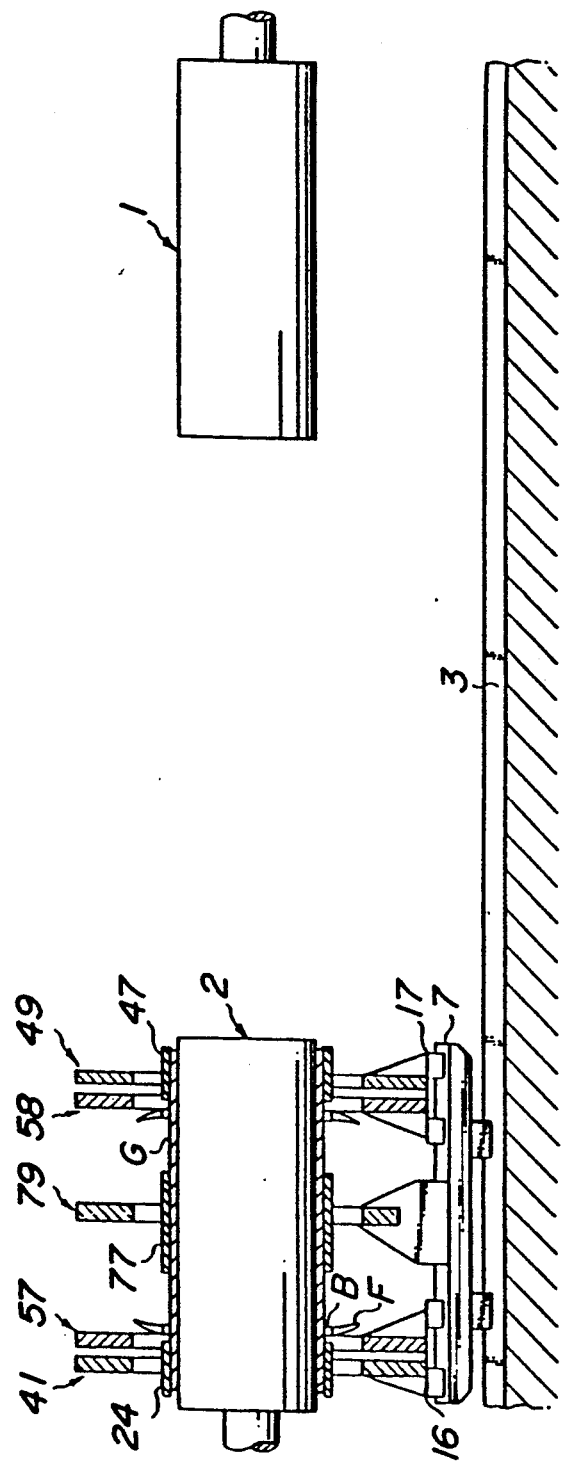

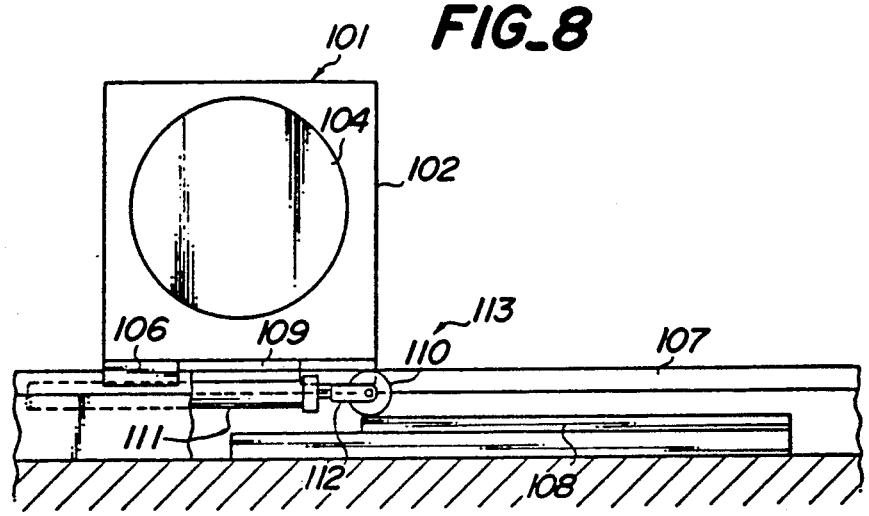
FIG_8
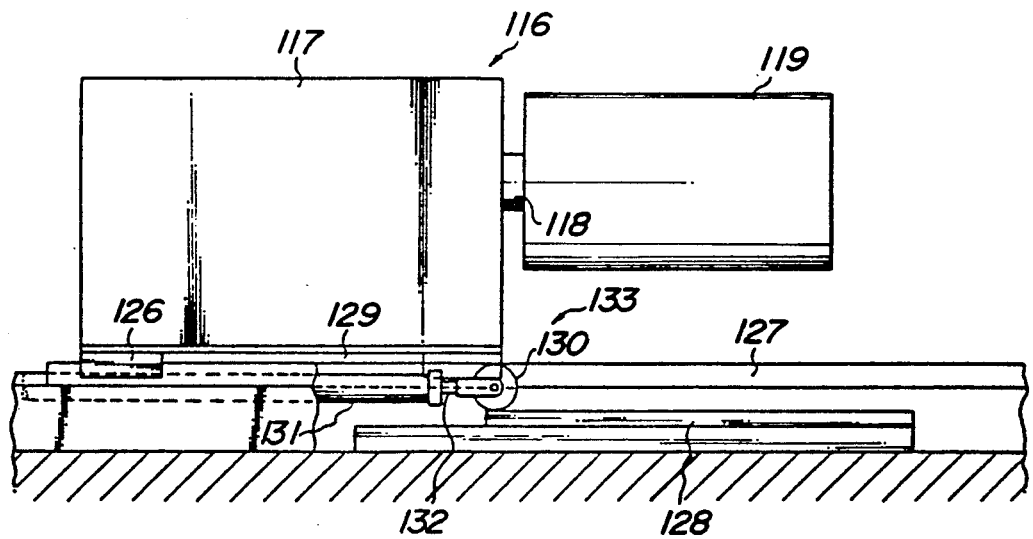
FIG_9

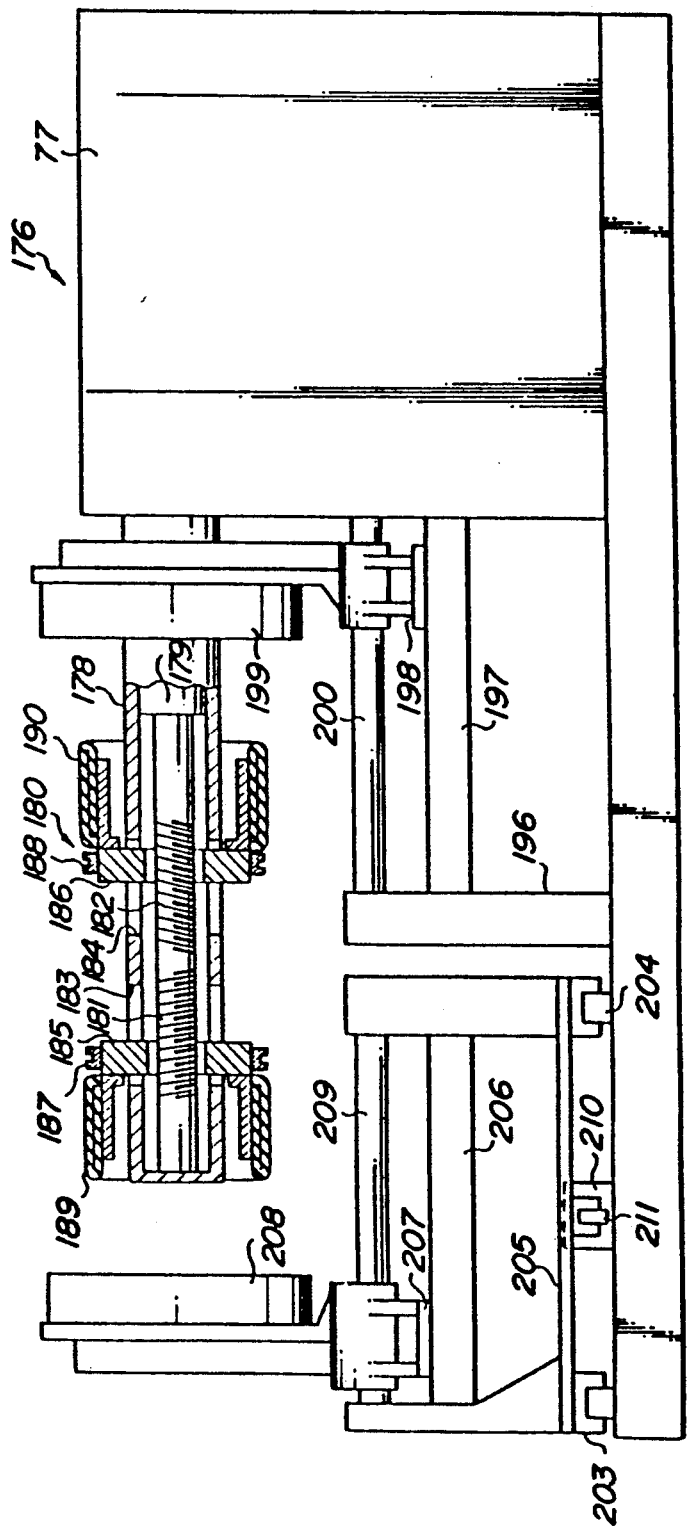

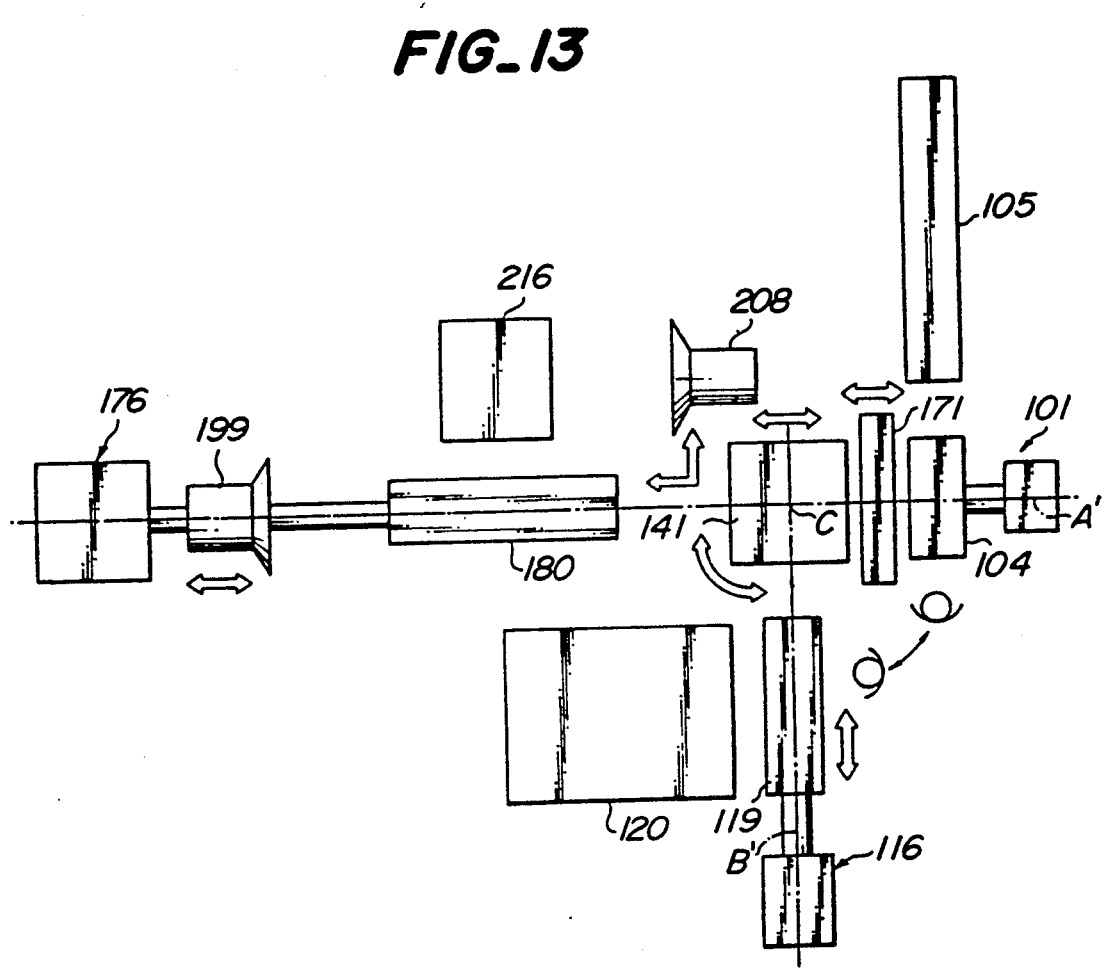
FIG_13

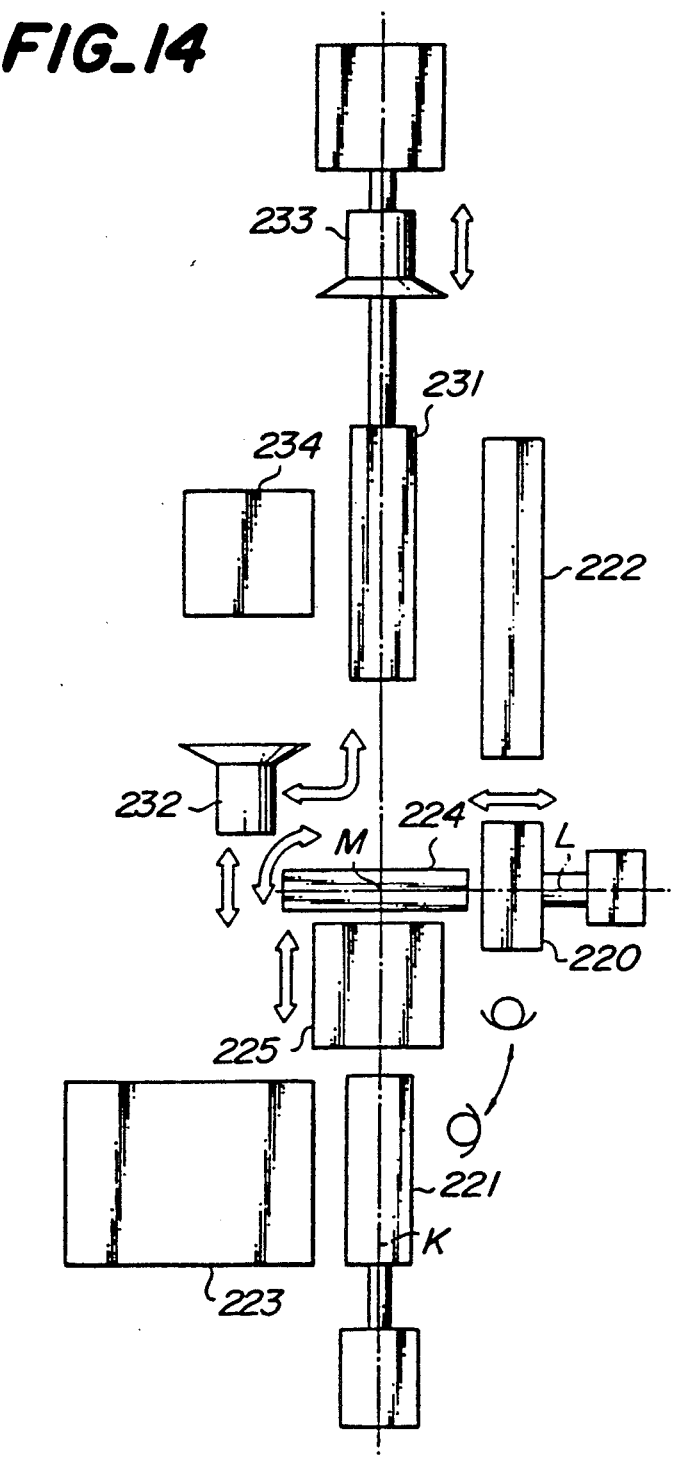
FIG_14

TIRE BUILDING MACHINE HAVING A CYLINDRICAL MEMBER TRANSFER APPARATUS

This is a divisional of application No. 07/300,881 filed Jan. 24, 1989.

BACKGROUND OF THE INVENTION

This invention relates to a cylindrical member transfer apparatus for grasping and transferring cylindrical members such as green cases or the like. More particularly, it relates to a tire building machine including the cylindrical member transfer apparatus for forming green tires by carcass bands and belt tread assemblies.

A cylindrical member transfer apparatus has been known is disclosed for example in Japanese Patent Application Publication No. 55-38,265. This apparatus includes carrying means mounted onto a center of an annular frame movable along rails for carrying a cylindrical tire constituting member at its center on its outside, and a pair of holding devices fixed to both ends of the annular frame for holding beads. In case that the tire constituting member is transferred and attached to a tire forming drum, first the beads are held by the holding devices, while the center of the tire constituting member is carried on its outside by the carrying means. The annular frame is then moved along the rails so that the tire constituting member is transferred to the forming drum to be fitted on its outside. Thereafter, the beads are set at predetermined positions at both the ends of the tire constituting member, and the tire constituting member is delivered from the carrying means to the tire forming drum.

If sizes of tires to be produced are changed, the set positions of the beads must be changed correspondingly. However, with the known transfer apparatus, it is very difficult to accommodate the change in size of tires because the holding means are mounted on the annular frame as above described. If the positions of the holding devices are shifted by loosening the mounting bolts, such an operation is very troublesome and time-consuming with resulting lower production efficiency.

Moreover, as the carrying means of the known apparatus supports the center of the tire constituting member, ends of the tire constituting member are likely to deform downwardly, particularly in case of a low strength constituting member, so that it becomes difficult to fit the member onto the forming drum.

On the other hand, a tire building machine has been known disclosed for example in U.S. Pat. No. 4,134,783. The disclosed building machine includes a belt forming drum for forming belt and tread assemblies by laminating belts and treads, a band forming drum so arranged whose axis perpendicularly intersects with an axis of the belt forming drum for forming carcass bands, a carcass drum arranged on the intersection of the axes of the belt and band forming drum and rotatable between a first position coaxial to the axis of the belt forming drum and a second position coaxial to the axis of the band forming drum, a carrier movable along the axis of the belt forming drum for transferring the belt and tread assembly from the belt forming drum to the carcass drum, and a transfer carrier movable along the axis of the band forming drum for transferring the carcass band from the band forming drum to the carcass drum. After the carcass band has been transferred from the transfer carrier to the carcass drum in the second position, the carcass drum is rotated to the first position and then shapes the carcass band into a toroidal shape. Thereafter, the belt and tread assembly which has been held by the carriers is attached on the carcass band to form a green tire.

As above described, with the prior art tire building machine, the carcass drum is arranged at the intersection of the axes of the belt forming and band forming drums. However, the carcass drum is inherently large because it must perform various operations such as the shaping operation, stitching operation and the like so that a wide space for the carcass drum is required in the proximity of the intersection. As a result, the belt forming drum and the band forming drum are greatly spaced apart from each other. Such forming drums are not yet completely automatized so that some manual operations by an operator are required. Therefore, the operator has to move in a wide area for his operations, with the result that the operator is forced to do hard work and the working efficiency is lowered. Moreover, as the large carcass drum is rotated, large power is required and at the same time forming accuracy is unavoidably lowered.

SUMMARY OF THE INVENTION

It is a primary object of the invention to provide an improved cylindrical member transfer apparatus capable of easily changing bead setting positions and cylindrical member grasping positions with high efficiency in the event of change in tire size, and also capable of grasping and transferring cylindrical members of low rigidity without deforming the members.

In order to achieve the object, the apparatus for cylindrical members according to the invention comprises a trolley movable toward and away from a forming drum, a pair of movable members movably supported on said trolley, bead holding means mounted on inner ends of the movable members for holding beads, grasping means mounted on outer ends of the movable members for grasping axially ends of a cylindrical member on its outside, respectively, and toward and away driving means for moving said movable members equal distances toward and away from each other.

In transferring a cylindrical member by the apparatus, the cylinder member is grasped at its axial ends by a pair of grasping means, and the movable trolley is moved toward and away from the forming drum. Moreover, in setting the beads, after the movable trolley has been moved to the forming drum to transfer the beads held by the bead holding means to a predetermined position on the cylindrical member, the forming drum is, for example, expanded to deliver the beads from the bead holding means to the cylindrical member. In this case, according to the invention both axial ends of the cylindrical member are grasped by the pair of grasping means so that even in the rigidity of the cylindrical member is low, the cylindrical member can be transferred without being deformed. As a result, the next fitting operation of the cylindrical member onto the forming drum can be easily effected.

If sizes of tires to be produced are changed, the size of the cylindrical member must be modified. Therefore, setting positions of the beads and grasped positions of the cylindrical member must be changed correspondingly. In this case, according to the invention the respective movable members are moved toward or away from each other by means of the toward and away driving means to move the bead holding means and the grasping means to predetermined positions. At this time, the movable members are moved equal distances on both sides of a reference point, so that the bead holding means and the grasping means can be easily moved to predetermined positions with high accuracy. Moreover, the bead holding means and the grasping means are moved in unison, so that they can be moved with high efficiency.

In another aspect, it is an object of the invention to provide a tire building machine which is able to lighten an operator's labor and improve operation efficiency and which accomplishes energy saving and improved formed accuracy.

In order to achieve this object, the tire building machine according to the invention comprises a first drum for forming a belt and tread assembly by laminating a belt and a tread, a second drum for forming a carcass band and arranged with its axis being substantially perpendicular to an axis of the first drum and movable to an intersection of the axes, first transfer means movable along the axis of the first drum for receiving the belt and tread assembly from the first drum and holding it, second transfer means movable along the axis of the first drum and rotatable between first and second positions where an axis of the second transfer means is coaxial to axes of the first and second drums, respectively, for receiving the carcass band from the second drum and holding it, and a forming drum arranged on the axis of the first drum and remote from said intersection for shaping the carcass band received from the second transfer means into a toroidal form and attaching the belt and tread assembly held by the first transfer means onto an outside of the carcass band to form a green tire.

In a preferred embodiment of the invention, the forming drum is provided at both axial ends with expansible and contractible bladders and cans are provided at both axial outsides of the forming drum for urging the bladders against the toroidal carcass band to turn up both axial ends of the carcass band about the beads, one of the cans being positioned between the intersection and the forming drum being laterally retractable from an axis of the forming drum, thereby avoiding any interference of the can with said first and second transfer means.

In another preferred embodiment of the invention the tire building machine comprises a second drum for forming a carcass band, a first drum arranged whose axis is substantially perpendicular to an axis of the second drum and movable toward an intersection of the axes for laminating a belt and a tread to form a belt and tread assembly, second transfer means movable along the axis of the second drum for receiving the carcass band from the second drum and holding it, first transfer means movable along the axis of the second drum and rotatable between a first position where an axis of the first transfer means is coaxial to the axis of the first drum and a second position where the axis of the first transfer means is coaxial to the axis of the second drum for receiving the belt and tread assembly from the first drum at the intersection and holding it thereat, and a forming drum arranged on the axis of the second drum remote from the intersection for shaping the carcass band received from the second transfer means into a toroidal form and attaching the belt and tread assembly held by the first transfer means onto an outside of the carcass band to form a green tire.

In this case, the second drum may be arranged on one side of the intersection and the forming drum is arranged on the other side of the intersection.

In forming a green tire using the apparatus according to the invention, a belt and a tread are laminated by means of the first drum to form a belt and tread assembly, while a carcass band is formed by the second drum. At this time, the second transfer means is at the intersection of the axes of the first and second drums in the second position where the axis of the second transfer means is coaxial to the axis of the second drum. Then, the second drum is moved toward the intersection, so that the second transfer means receives the carcass band from the second drum and holds it. Thereafter, the second transfer means is rotated to the first position where the axis of the second transfer means is coaxial to the axis of the first drum.

On the other hand, the first transfer means is moved to the first drum along its axis and receives the belt and tread assembly from the first drum and holds it. Then, the first and second transfer means are moved in synchronism with each other or separately along the axis of the first drum to the forming drum. In this case, if the first drum is arranged between the intersection and the forming drum, the first drum will interfere with the first and second transfer means. Therefore, according to the preferred embodiment of the invention the first drum is made laterally retractable to avoid any interference of the first drum with the first and second transfer means.

Then, when the forming drum receives the carcass band from the second transfer means, the second transfer means moves away from the forming drum. The forming drum then performs the shaping of the carcass band into a toroidal form and attaches the belt and tread assembly held by the first transfer means onto an outside of the carcass band to form a green tire.

In this manner, it is sufficient that there is only a space above the intersection for the second transfer means awaiting the next operation. Moreover, the second transfer means performs only the rotation of itself and the holding the carcass band, so that the second transfer means is smaller than a carcass drum. As a result, the first and second drums can be arranged closer to each other than in the prior art.

Therefore, even if an operator moves between the first and second drums for manually assisting the operation of these drums, it is no trouble to the operator because of the short distance between both the drums. Accordingly, the labor of the operator is lightened and the working efficiency is improved. Moreover, as the second transfer means to be rotated is small, saving energy is accomplished and the formed accuracy is also improved.

Moreover, the forming drum may be provided at both axial ends with expansible and contractible bladders and cans may be provided at both outsides of the forming drum. With this arrangement, after the carcass band is deformed into a toroidal form, both the axial ends of the carcass band are turned up about the beads by the use of the bladder and the cans. In this case, the can arranged between the intersection and the forming drum is made laterally retractable from the axis of the forming drum to avoid any interference of the can with the first and second transfer means.

In the another embodiment of the invention, when the first drum is moved toward the intersection, the first transfer means awaiting on the intersection receives the belt and tread assembly from the first drum and holds it and then rotates from the first position to the second position. On the other hand, the second transfer means receives the green case from the second drum and holds it. Thereafter, the first and second transfer means move along the axis of the second drum.

In the case where the second drum is arranged on one side of the intersection and the forming drum is arranged on the other side of the intersection, there is no risk of an interference of the first drum with the first and second transfer means. Therefore, it is not required to retract the first drum laterally from the axis of the forming drum.

The invention will be more fully understood by referring to the following detailed specification and claims taken in connection with the appended drawings.

BRIEF DESCRIPTION OF THE DRAWINGS

FIG. 3 is a perspective view of an arc member for grasping a cylindrical member;

FIG. 4 is a perspective view of an arc member for holding a bead;

FIG. 5 is a partially removed front elevation of the proximity of toward and away driving means used in the apparatus shown in FIG. 1;

FIGS. 6a, 6b and 6c are views for explaining the operations of the apparatus according to the invention;

FIG. 8 is a side view showing a first drum of the apparatus shown in FIG. 7;

FIG. 9 is a side view illustrating a second drum of the apparatus shown in FIG. 7;

FIG. 12 is a partially broken away front view illustrating the proximity of a forming drum of the apparatus shown in FIG. 7;

FIG. 13 is a plan view illustrating an entire apparatus of a further embodiment of the invention; and FIG. 14 is a plan view showing an entire apparatus of a further modification of the invention.

EXPLANATION OF THE PREFERRED EMBODIMENTS

Figure 1:
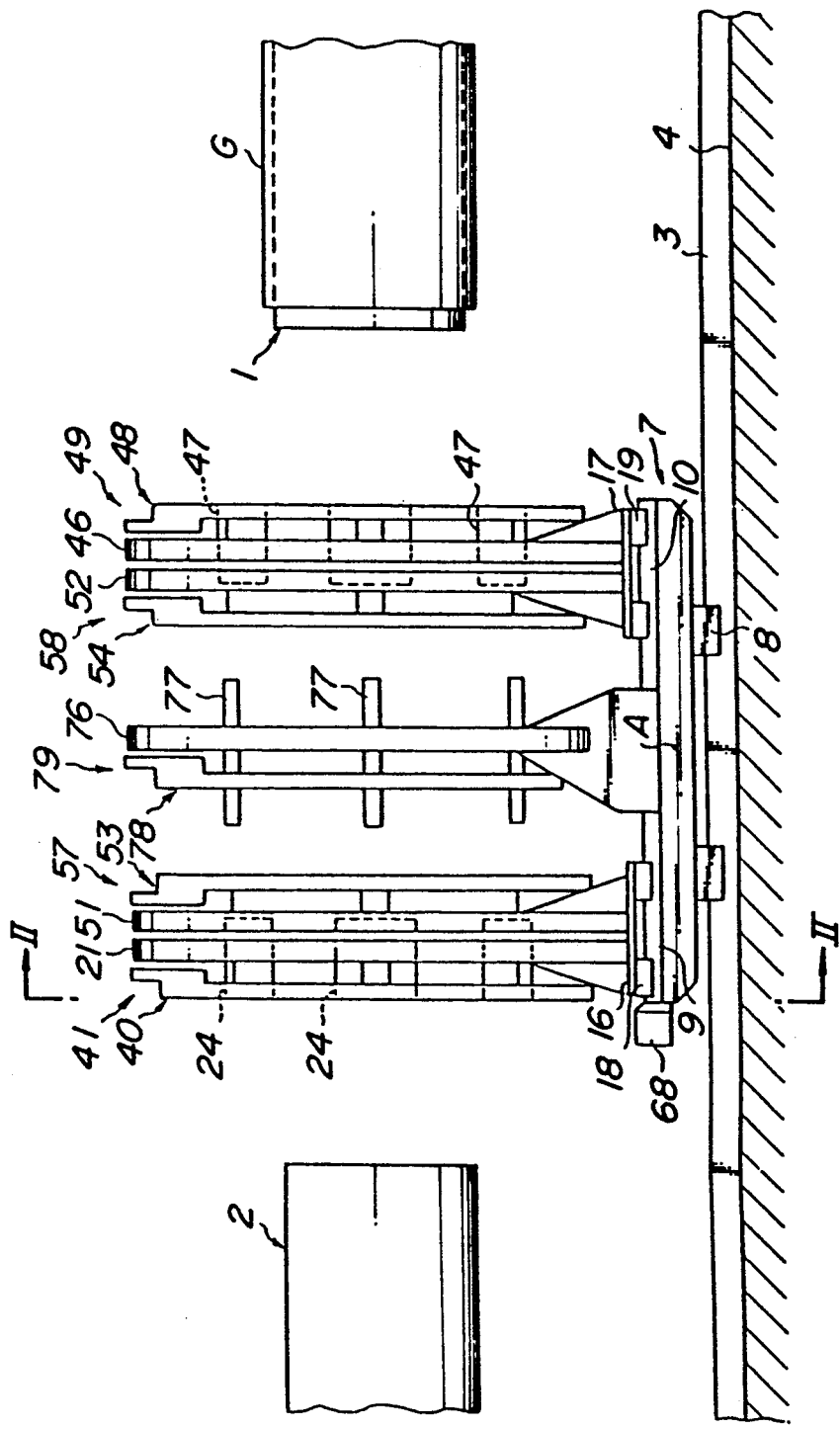
FIG. 1 is a front elevation illustrating one embodiment of the invention.

Referring to FIG. 1 illustrating an embodiment of the cylindrical member transfer apparatus according to the invention, a first forming drum 1 whose diameter is expansible and contractible is rotatably arranged and a second forming drum 2 whose diameter is also expansible and contractible is arranged coaxial with the first forming drum. A cylindrical member G for example a green case is attached about the first forming drum 1.

Rails 3 are arranged on a floor 4 and extend in parallel with axes of the first and second forming drums 1 and 2. A movable trolley 7 has a plurality of slide bearings 8 which are fixed to an underside of the trolley 7 and slidably engage the rails 3. The trolley 7 is driven on the rails 3 by means of driving means (not shown) such as a motor, a chain driven by the motor, a cylinder and a rack and pinion mechanism and moves toward and away from the first and second forming drums 1 and 2.

Rails 9 parallel to the rails 3 are arranged on an upper surface of the trolley 7 at its front portion, while rails 10 parallel to the rails 9 are arranged on the upper surface of the trolley 7 at its rear portion. A pair of movable members 16 and 17 are provided at their lower ends with a plurality of slide bearings 18 and 19 fixed thereto slidably engaging the rails 9 and 10 so that movable members 16 and 17 are movably supported on the movable trolley 7.

Figure 2:
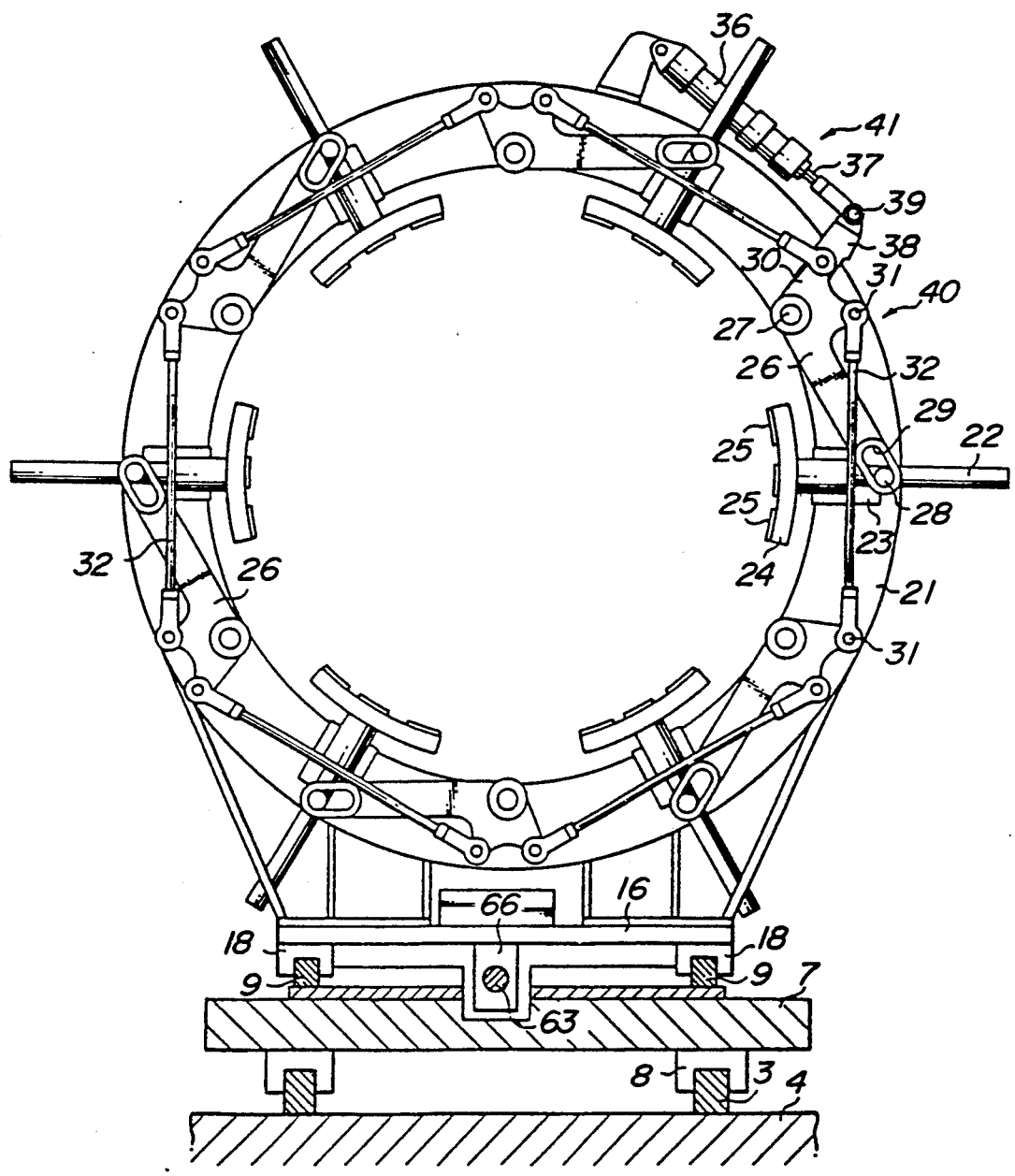
FIG. 2 is a sectional view taken along the line II—II in FIG. 1.

As shown in FIG. 2, an annular member 21 whose diameter is larger than a diameter of a cylindrical member G is fixed to the movable member 16 in alignment with the first and second forming drums 1 and 2 on an outer side of the movable member 16 or a slide remote from a center point A of the movable trolley 7. To the annular member 21 are fixed a plurality of guides 23 circumferentially spaced apart from each other. Each of the guides 23 supports a movable rod 22 slidably movable in the guide 23 radially of the annular member 21. As shown in FIG. 3, an arc member 24 is fixed to an inner end of each movable rod 22. Each arc member 24 has on its inner surface a plurality of magnets 25 for attracting steel cords of the cylindrical member G to grasp it on its outside.

Referring again to FIG. 2, a plurality of transmission arms 26 are rockalby supported on the annular member 21 by means of pins 27. Each of the transmission arms 26 is formed with a pair of projections 30 and an elongated aperture 29 for receiving a pin 29 fixed to each movable rod 22. Projections 30 of the adjacent transmission rods 26 are connected by synchronism rods 32 whose ends are pivotally connected to the projections 30 by means of pins 30. As a result, when the transmission arms 26 are rocked in synchronism with each other with the aid of the synchronism rods 32, the movable rods 22 are moved radial directions in synchronism with each other. A pneumatic cylinder 36 has an intermediate stopping mechanism and is connected to the annular member 21. The pneumatic cylinder 36 includes a piston rod 37 whose outer end is connected to a transmission arm 26 through a bracket 38 and a pin 39.

The movable rods 22, the transmission arms 26, the synchronism rods 32 and the pneumatic cylinder 36 form an expansible and contractible mechanism 40 in its entirety for expanding and contracting the arc members 24 by moving them in radial directions. Moreover, the annular member 21, the arc members 24 and the expansible and contractible mechanism 40 form front grasping means 41 in its entirety for grasping an axially front end of the cylindrical member G on its outside.

Referring back to FIG. 1, on an outer side of the movable member 17 are also provided an annular member 46, arc members 47 and expansible and contractible mechanism 48 having the same constructions as those of the annular member 21, the arc members 24 and the expansible and contractible mechanism 40. The annular member 46, the arc members 47 and the expansible and contractible mechanism 48 form rear grasping means 49 in its entirety for grasping an axially rear end of the cylindrical member G on its outside.

Referring back to FIG. 1, on an outer side of the movable member 17 are also provided an annular member 46, arc members 47 and an expansible and contractible mechanism 48 having the same construction as those of the annular member 21, the arc members 24 and the expansible and contractible mechanism 40. The annular member 46, the arc members 47 and the expansible and contractible mechanism 48 form rear grasping means 49 in the entirety for grasping an axially rear end of the cylindrical member G on its outside.

Moreover, on inner sides of the movable members 16 and 17 or on side near to the center point A of the movable trolley 7 there are provided annular members 51 and 52 and expansible and contractible mechanisms 53 and 54 similar to the annular member 21 and the expansible and contractible mechanism 40. Arc members 55 are fixed to inner ends of movable rods 22 of the expansible and contractible mechanism 53 and 54 (FIG. 4). Each of the arc members 55 has a plurality of magnets 56 for attracting and holding a bead B with a filler F on its side surface.

With this arrangement, when the size of tires to be produced is changed, the arc members 55 are radially moved to expand or contract correspondingly thereto by means of the expansible and contractible mechanisms 53 and 54. The annular member 51, the expansible and contractible mechanism 53 and the arc members 55 form front bead holding means 57 in its entirety for holding the bead B. The annular member 52, the expansible and retractable mechanism 54 and the arc members 55 form rear bead holding means 58 in its entirety for holding the bead B.

Referring to FIGS. 1 and 5, bearings 61 and 62 are provided at front and rear ends of the movable trolley 7, respectively, to rotatably support both ends of a screw shaft 63 has on its front portion for example right-hand screw 64 and on its rear portion left-hand screw 65 reverse to the screw 64, nuts or internally threaded screw blocks 66 and 67 are fixed to under surfaces of the movable members 16 and 17, respectively. The screw shaft 63 is threadedly engaged to the screw blocks 66 and 67 so that the right-hand screw 64 engages the screw block 66 and the left-hand screw 65 engages the screw block 67.

To the front end of the trolley 7 is fixed a motor with a reduction gear 68 whose output shaft 69 is connected to the screw shaft 63. As a result, when the motor 68 is energized to rotate the screw shaft 63, the movable members 16 and 17 are moved equal distances toward and away from each other on both sides of the center point A. The screw shaft 63, the screw blocks 66 and 67 and the motor 68 form toward and away driving means in its entirety for moving the movable members 16 and 17 equal distances toward and away from each other.

Referring back to FIG. 1, there are at the center of the movable trolley an annular member 76, arc members 77 and an expansible and contractible mechanism 78 similar in construction to the annular member 76, arc members 77 and the expansible and contractible mechanism 40. The annular member 76, the arc members 77 and the expansible and contractible mechanism 78 form a center grasping means 79 for grasping the center portion of the cylindrical member G on its outside.

The operation of the apparatus of the embodiment of the invention above described will now explained.

It is assumed that the movable trolley 7 is posed or awaiting in position between the first and second forming drums 1 and 2 and the cylindrical member G has been attached to the first forming drum 1. At this time, the arc members 24, 47 and 77 of the front, rear and center grasping means 41, 49 and 79 are expanded outwardly to the maximum with the aid of the expansible and contractible mechanisms 40, 48 and 78, and beads B with fillers F are attached and held to the arc members 55 of the front and rear bead holding means 57 and 58.

The driving means is then actuated to drive the movable trolley 7 guided by the rails 3 toward the first forming drum 1. When a mark on the cylindrical member G at a center of its axial direction coincides with a mark on the center grasping means 79, the movable trolley is stopped. At this time, the front, rear and center grasping means 41, 49 and 79 and the front and rear bead holding means 57 and 58 are fitted on the outside of the cylindrical member G to surround it and the beads B with the fillers F held by the front and rear bead holding means 57 and 58 have arrived at predetermined bead set positions.

Then parts of the first forming drum 1 are expanded to press the cylindrical member G against the inner circumference of the beads B so that the beads B with the fillers F are set on the cylindrical member G. Thereafter, the expansible and contractible mechanisms 40, 48 and 78 of the front, rear and center grasping means 41, 49 and 79 are actuated to cause the arc members 24, 47 and 77 to move radially inwardly so as to reduce the diameters. These operations are carried out by extending the piston rods 37 of the pneumatic cylinder 36 of the expansible and contractible mechanisms 40, 48 and 78 to rock the transmission arms 26 connected to each other by the synchronism rods 32, thereby moving the movable rods 22 in synchronism with each other.

When the arc members 24, 47 and 77 abut against the outer circumference of the cylinder member G, the intermediate stopping mechanisms of the pneumatic cylinders 36 of the expansible and contractible mechanisms 40, 48 and 78 are actuated to lock the piston rods 37 of the pneumatic cylinder 36 thereat. As a result, the front, rear and center portion of the cylindrical member B are gasped by the front, rear and center grasping means 41, 49 and 79 on its outside. This position is shown in FIG. 6b.

Then, after the first forming drum 1 is contracted, the driving means is again actuated to move the movable trolley 7 to transfer the cylindrical member G toward the second forming drum 2. In this manner, as the cylindrical member G is grasped with its front, rear and center portions by the front and rear grasping means 41 and 49, the cylindrical member G is transferred, while it is hardly deformed even if the rigidity of the member G is low. As a result, it is easy to fit the cylindrical member G on the second forming drum 2 thereafter.

In this embodiment, moreover, in order to further reduce the deformation of the cylindrical member G, the center portion of the cylindrical member G is also grasped by the center grasping means 79. When the cylindrical member G is fitted on the outside of the second forming drum 2 and the centers of the axial direction on the member G and forming drum 2 are coincident with each other, the movable trolley 7 is stopped. Thereafter, the second forming drum 2 is expanded to be pressed against the inner circumference of the cylindrical member G. This position is shown in FIG. 6c.

Thereafter, the expansible and contractible mechanisms 40, 48 and 78 of the front, rear and center grasping means 41, 49 and 79 are actuated to move the arc members 24, 47 and 77 radially outwardly so as to clear from the cylindrical member G. Then, the driving means is again actuated to move the movable trolley 7 away from the second forming drum 2 to its initial awaiting position.

In case the size of the tires to be formed is changed, it is required to modify the size of the cylindrical member G and hence to change the set positions of the beads B with the filers F and grasping positions of the cylindrical member G. In this case, the motor 68 is energized to rotate the screw shaft 63 through a number of predetermined revolutions to move the movable members 16 and 17 along the rails 9 and 10. As the screw 66 of the movable member 16 engages the right-hand screw 64 and the screw 64 and the screw block 67 of the movable member 17 engages the left-hand screw 65, the movable members 16 and 17 are moved equal distances toward and away from each other on both sides of the center point A. When distances between the arc members 55 of the front and rear holding means 57 and 58 reaches a predetermined value, the motor 68 is deenergized. In this manner, positions of the arc members 55 of the front and rear bead holding means 57 and 58 in axial directions of the forming drums are adjusted correspondingly to the change in size of the tires to be produced.

On the other hand, an adjustment of radial positions of the arc members 55 of the front and rear bead holding means 57 and 58 is effected by actuation of the expansible and contractible mechanisms 53 and 54. As the movable members 16 and 17 are moved equal distances on both sides of the center point A in this manner, the axial positions of the arc members 55 of the front and rear bead holding means 57 and 58 and the arc members 24 and 47 of the front and rear grasping means 41 and 49 can be easily adjusted with high accuracy. Moreover, by the movement of the movable members 16 and 17, the front grasping means 41 and the front bead holding means 57 and the rear grasping means 49 and rear bead holding means 58 are moved in unison, so that the operation efficiency is improved in comparison with the case that these members are separately moved.

In the embodiment above described, the expansible and contractible mechanisms 40, 48, 53, 54 and 78 have been explained as using the movable rods 22, transmission arms 26, the synchronism rods 32 and the cylinder 36. In this invention, however, radially extending cylinders or cam mechanisms may be used for this purpose. In the above embodiment, moreover, the arc members 24 having the magnets 25 have been explained for grasping the cylindrical member G. However, vacuum cups may be used for the same purpose. Furthermore, a rack and pinion mechanism may be used as the toward and away driving means 70 instead of the screw shaft 63 and the motor 68 in the above embodiment. Moreover, a manual hand-wheel may be used in substitution for the motor above described.

As can be seen from the above description according to the invention, if the size of tires to be produced is changed, bead set positions and grasping positions of a cylindrical member can be easily modified with high efficiency. Moreover, even if a cylindrical member has a low rigidity, it can be grasped and transferred with little deformation.

Another embodiment of the invention will be explained hereinafter.

Figure 7:
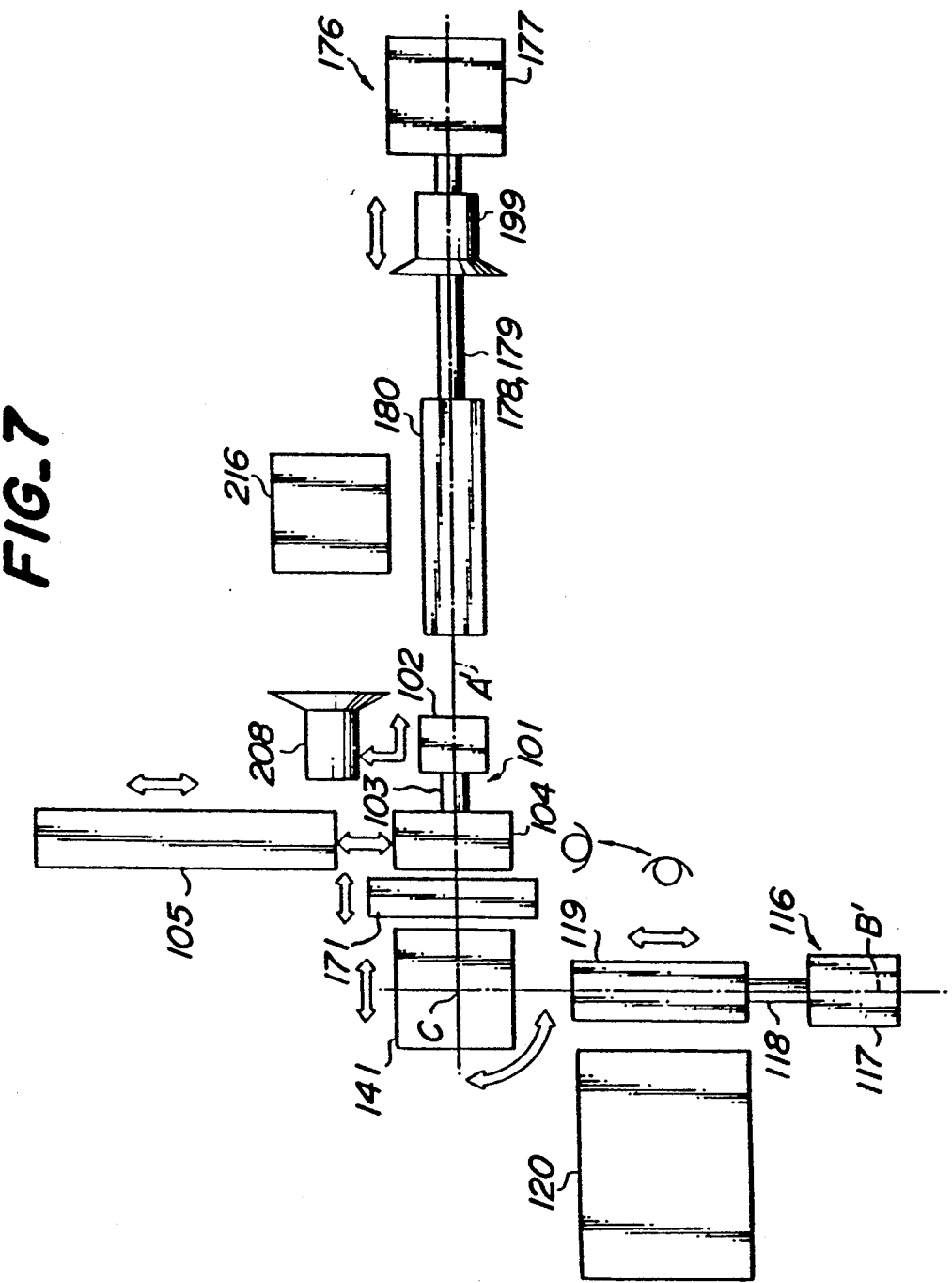
FIG. 7 is a plan view schematically illustrating an entire apparatus of another embodiment of the invention.

Referring to FIGS. 7 and 8 illustrating a tire building machine according to the invention, a first building machine 101 comprises driving means 102, a horizontal main shaft 103 driven by the driving means 102, and a first cylindrical drum 104 provided on the main shaft 103 and extending in an axis A' of the main shaft 103. The first drum 104 is expansible and contractible. In front of the first building machine 101, a servicer 105 is arranged for successively supplying belts and treads to the first building drum 101. The belts and treads supplied from the servicer 105 are attached and laminated one by one to a circumference of the rotating first drum 104 to form a belt and tread assembly.

To a lower portion of the first building machine 101 are secured a plurality of slide bearings 106 which engage rails 107 extending in directions perpendicular to the axis A'. A pinion 110 is in mesh with a rack 108 extending in parallel with the rails 107 and further in mesh with a rack 109 fixed to an underside of the driving means 102 and extending on parallel with the rails 107. The pinion 110 is supported on an outer end of a pinion rod 112 of a cylinder 111 extending in the direction of the rails 107. As a result, when the cylinder 111 is actuated, the first building machine 101 is moved guided by the rails 107 in the direction perpendicular to the axis A'. The rails 107, the racks 8 and 9, the pinion 110, and the cylinder 111 form a retracting mechanism 113 in its entirety for retracting the first drum 104 laterally or forwardly from the axis A'.

Moreover, the servicer 105 must be also moved forwardly at the same time when the first building machine 101 is retracted forwardly, so that the servicer 105 is also provided with a moving mechanism (not shown). There is a second building machine 116 as shown in FIGS. 7 and 9 on the lower left side as viewed in the plan view of FIG. 7. The second building machine 116 comprises driving means 117, a horizontal main shaft 118 rotatively driven by the driving means 117, and a second drum 119 provided on the main shaft 118 which is cylindrical and expansible and contractible. The second building machine 116 is so arranged so that an axis B' of its second drum 119 intersects substantially perpendicularly to the axis A' of the first drum 104. Although the axes A' and B' intersect perpendicularly to each other in this embodiment, they may intersect at an angle within a range of 60° to 120°.

Moreover, a servicer 120 for supplying carcasses or the like to the second building machine 116 is arranged on its left side as viewed in FIG. 7. Carcasses or the like supplied from the servicer 120 are attached one by one to a circumference of the rotating second drum 119 to form a carcass band G'. To a lower portion of the second building machine 116 are fixed a plurality of slide bearings 126 engaging rails 127 extending in parallel with the axis B'.

A track 128 extends in parallel with the rails 127. A pinion 130 is supported on an outer end of a piston rod 132 of a cylinder 131 in parallel with the rails 127 and is in mesh with the rack 128 and also in mesh with a rack 129 fixed to a lower portion of the driving means 117 in parallel with the rails 127. As a result, when the cylinder 131 is actuated, the second building machine 116 is moved guided by the rails 127 along the axis B' toward and away form an intersection C of the axes A' and B'. The rails 127, the racks 128 and 129, the pinion 130 and the cylinder 131 form a moving mechanism 133 for moving the second building machine 116 toward the intersection C along the axis B'.

Figure 10:
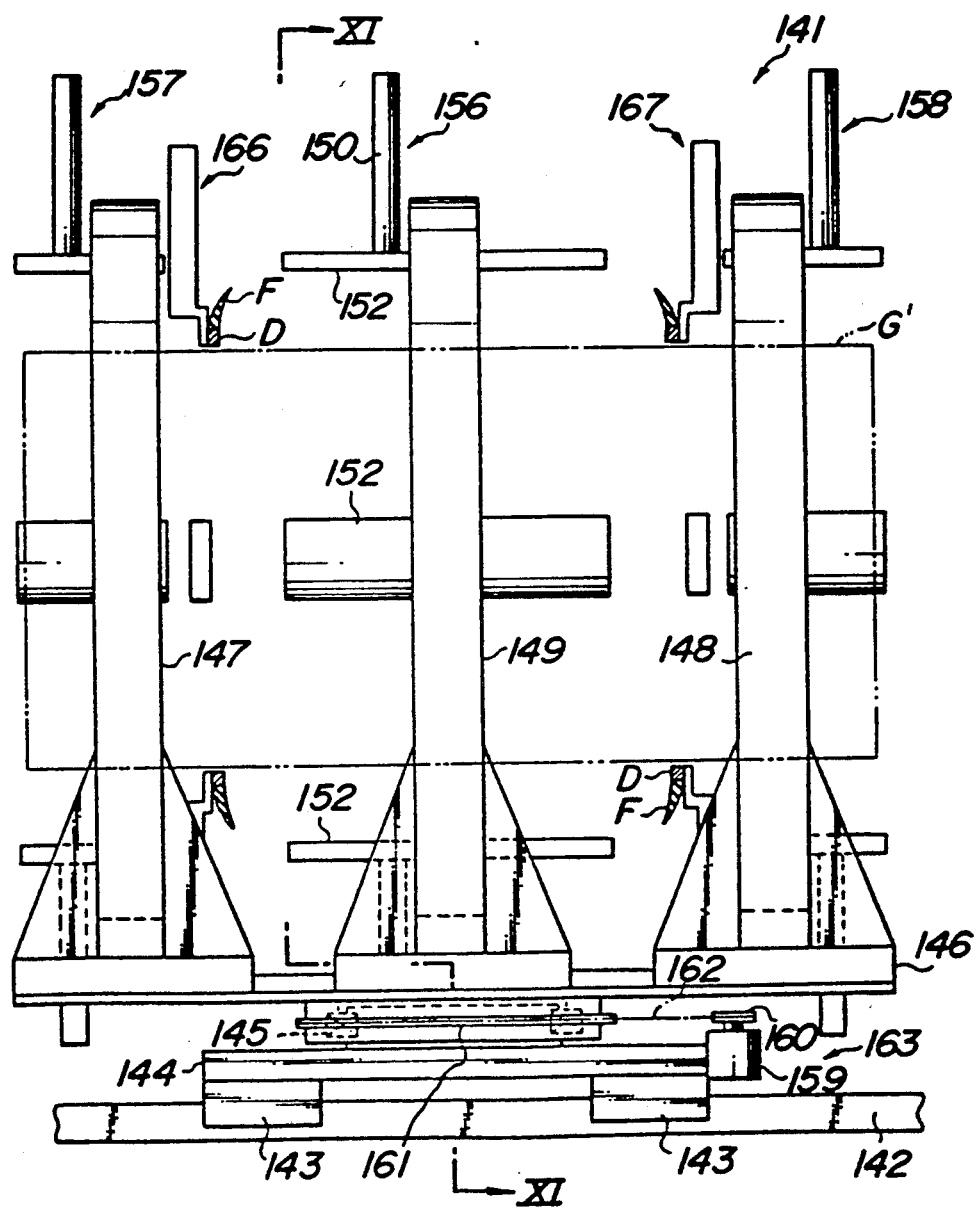
FIG. 10 is a front elevation illustrating a second transfer means of the apparatus shown in FIG. 7.
Figure 11:
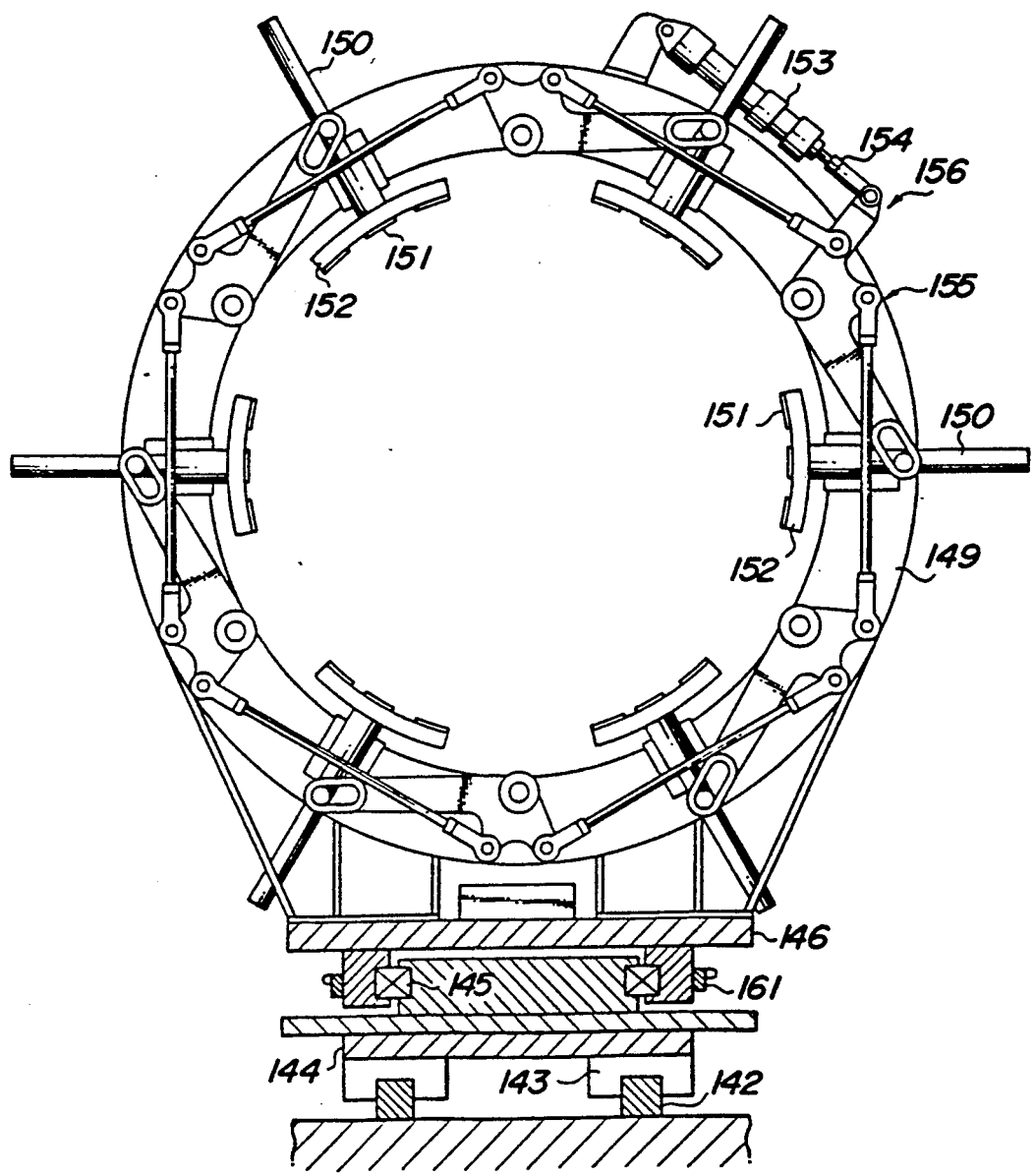
FIG. 11 is a sectional view taken along the line XI—XI in FIG. 10.

Referring to FIGS. 7, 10 and 11, a second transfer apparatus 141 comprises a trolley 144 having slide bearings 143 fixed thereto engaging rails 142 in parallel with the axis A' of the first drum 104. A rotative frame 146 is rotatably supported on the trolley 144 through bearings 145. Support rings 147, 148 and 149 are concentrically mounted on the rotative frame 146 at both ends and a center. A plurality of holders 150 are supported in the center support ring 149 in a radially movable manner and circumferentially equally spaced apart from each other.

Each of the holders 150 has at its radially inner end an arc member 152 having permanent magnets 151 fixed thereto. A cylinder 153 is connected to the center support ring 149. An outer end of a piston rod of the cylinder 153 is connected to the holders 150 through a link mechanism 155. When the piston rod 154 of the cylinder 153 is extended, all the holders 150 are moved radially inwardly in synchronism with each other to attract the carcass band G' with the aid of the permanent magnets 151 and hold the band G' at its axial center on outside. This mechanism is substantially the same as that explained with reference to FIG. 2. The holders 150, the cylinder 153 and the link mechanism 155 form a holding mechanism 156 for receiving the carcass band G' formed by the second drum 119 therefrom and attracting and holding the center of the band G' on its outside. The receiving the band G' is effected at the awaiting position of the second transfer means 141 or at the intersection C.

On the other hand, the support rings 147 and 148 are also provided with holding mechanisms 157 and 158 similar in construction to the holding mechanism 156, respectively. These holding mechanisms 157 and 158 receive the carcass band G' from the second drum 119 and attract and hold it at its axial ends on its outside. Moreover, the second transfer means 141 can be moved guided by the rails 142 along the axis A' of the first drum 104 by means of a driving mechanism (not shown), for example, a chain driven by a motor, a cylinder or a rack and pinion mechanism.

Moreover, on the trolley 144 is fixed a motor 159 is fixed to which a sprocket 160 is mounted. A chain 162 extends about the sprocket 160 and a sprocket 161 fixed to the rotative frame 146. When the motor 159 is energized, the rotative frame 146 is rotated about a vertical axis. The motor 159, the sprockets 160 and 161 and the chain 162 form a rotating mechanism 163 for rotating the second transfer means 141 between first and second positions (90° in this embodiment.)

In this case, the "first position" is an angular position that the axis A of the first drum 104 is aligned with axes of the support rings 147, 148 and 149 and the holding mechanisms 156, 157 and 158, and the "second position" is an angular position that the axis B of the second drum 119 is aligned with axes of the support rings 147, 148 and 149 and the holding mechanisms 156, 157 and 158. Moreover, the support rings 147 and 148 at both the ends of the trolley 144 are provided with head holding mechanisms 166 and 167 having permanent magnets built therein for attracting and holding beads D with fillers F, respectively.

There is provided first transfer means 171 substantially similar in construction to that of the second transfer means 141 for receiving a belt and tread assembly from the first drum 104 and holding it. However, since the first transfer means 71 holds only the belt and tread assembly narrower than the carcass band G', it comprises only a support ring and a holding mechanism substantially similar in construction to the support ring 149 and the holding mechanism 156 at the center of the rotative frame 146 without having those corresponding to the support rings 147 and 148, the holding mechanisms 157 and 158 and the bead holding mechanisms 166 and 167 of the second transfer means 141. Further, since the first transfer means 171 is not rotated, a frame corresponding to the rotative frame is fixed to a trolley. The first transfer means 171 is also moved guided by the rails 142 along the axis A of the first drum 104 by means of a driving mechanism similar to that above described.

Referring to FIGS. 7 and 12, a building machine 176 is arranged on the axis A' of the first drum 104 remote from the intersection C. Between the building machine 176 and the intersection C there are arranged the first building machine 101 and the first transfer means 171 in a waiting condition. The building machine 176 comprises driving means 177, a horizontal hollow shaft 178 rotatively driven by the driving means 177, a main shaft 179 accommodated in the hollow shaft 178 and rotatively driven together with or separately from the hollow shaft 178 by the driving means 177, and a forming drum 180 provided on the hollow shaft 178 and the main shaft 179. An axis of the forming drum 180 is concentric to the axis A' of the first drum 104.

The main shaft 179 is formed on its outer surface with a right-hand screw 181 and a left-hand screw 182. On the other hand, the hollow shaft 178 is formed with slits 183 and 184 extending in its axial direction. Sliders 185 and 186 are threadedly engaged with the right-hand and left-hand screws 181 and 182 and slidably engaged in the slits, respectively. When the hollow shaft 178 and the main shaft 178 are rotated relative to each other, these slides 189 and 186 are moved equal distances toward and away from each other together along the axis of the main shaft 179.

These sliders 185 and 186 support on their outer circumferences expansible and contractible bead supports 187 and 188 which support the beads D on its inside through the carcass band G'. Moreover, on the outer circumferences of the sliders 185 and 186, expansible and contractible bladders 189 and 190 are provided. The sliders 185 and 186, the bead supports 187 and 188 and bladders 189 and 190 form the forming drum 180 in its entirety. As a result, the bladders 189 and 190 are arranged at both the ends of the forming drum 180. This forming drum 180 performs the shaping the carcass band G' received from the second transfer means 141 into a toroidal shape and attaches onto the outside of the carcass band G' the belt and tread assembly held by the first transfer means 171 to form a green tire.

A rodless cylinder 197 in parallel with the main shaft 179 is fixed to the dividing means 177 and a frame 196 arranged immediately below the forming drum 180. The rodless cylinder 197 has a slider 198 to which is secured a can 199. The can 199 is coaxial to the forming drum 180 and outwardly thereof between the driving means 177 and the forming drum 180. When the rodless cylinder 197 is actuated, the can 199 is moved guided by a guide shaft 200 fixed to the frame 196 and the driving means 177 in the axial direction of the forming drum 180 so that the expanded bladder 190 is urged to the toroidal carcass band G' to form or turn up an axial end of the carcass band G' about the bead D. On the left side of the frame 196 as viewed in FIG. 12, rails 204 are arranged perpendicularly to the guide shaft 200. On the rails 204 is supported a movable frame 205 having slide bearings 203 movable in the directions of the rails 204. To the movable frame 205 is also fixed a rodless cylinder 206 in parallel with the rodless cylinder 197. The rodless cylinder 206 has a slider 207 to which is fixed a can 208 which is arranged coaxial to the forming drum 180 outwardly thereof between the intersection C and the forming drum 180. When the rodless cylinder 206 is actuated, the cam 208 is also moved guided by a guide shaft 209 fixed to the movable frame 205 in the axial directions of the forming drum 180 so that the expanded bladder 189 is urged to toroidal carcass band G' to fold or turn up an axial end of the carcass band G' about the bead D.

A cylinder 210 is arranged in parallel with the rails 204 and has a piston rod 211 whose outer end is connected to the movable frame 205. When the cylinder 210 is actuated to retract the piston rod 211, the can 208 is retracted from the axis of the forming drum 180 laterally or on the front side in this embodiment or the upper side as viewed in FIG. 1. A stitching mechanism 216 is arranged laterally or on the front side of the forming drum 180 for stitching sidewalls and tread of green tires.

The operation of the apparatus of this embodiment will be explained hereinafter.

It is assumed that the expanded first drum 104 on the axis A' is being rotatively driven by means of the driving means 102 and belts and treads are being supplied successively to the first drum 104 from the servicer 105. In this manner, the belts and treads are attached one by one onto the circumference of the first drum 104 in laminations to form a belt and tread assembly. On the other hand, the expanded second drum 119 is rotatively driven by the driving means 117, while carcasses and the like are supplied form the servicer 120 to the second drum 119, with the result that the carcass and the like are attached one by one onto the circumference of the second drum 119 to form a carcass band G'.

In this case, in the forming the belt and tread assembly and the carcass band G' an operator must sometimes assist the operation of the first drum 104 and the carcass band G'. However, it is only required to have a relatively small space for arranging the second transfer means 141 because it is smaller than the building machine 176. Therefore, the distance between the first and second forming drums 104 and 119 can be shortened so that the labor of the operator is made easy and the working efficiency is improved. However, in the forming operation the second transfer means 141 is waiting above the intersection C in the second position where the axis of the second position where the axis of the second transfer means 141 is coaxial to the axis B', and the first transfer means 171 is waiting on the axis A between the second transfer means 141 and the first forming drum 104. On the other hand, the can 208 has been moved forward to retract form the axis A'.

Upon completion of the forming operation of the carcass band G' by the second drum 119, the cylinder 131 is actuated to extend its piston rod 32, so that the second drum 119 is moved along the axis B toward the intersection C to loosely fit the second drum 119 in the holding mechanisms 156, 157 and 158 of the second transfer means 141. Then, the piston rods 154 of the cylinders 153 of the holding mechanisms 156, 157 and 158 are extended, and the movements of the piston rods 154 are transmitted through the link mechanisms 155 to all the holders 150. As a result, all the holders 150 of the holding mechanisms 156, 157 and 158 are moved radially inwardly in synchronism with each other so that their permanent magnets 151 abut against the carcass band G' on the second drum 119 and attract it.

When the second drum 119 is contracted under this condition, the holding mechanisms 156, 157 and 158 of the second transfer means 141 receive the carcass band G' from the second drum 119 and hold it. At this time, the bead D with the filer F has been previously supplied to the bead holding mechanisms 166 and 167 from the operator or the bead supply mechanism and held therein. Thereafter, the cylinder 131 is actuated to retract the piston rod 132 to move the second drum 119 away from the second transfer means 141 into its initial position, while the second drum 119 is expanded.

The first drum 104 is then contracted so that the first transfer means 171 receives the belt and tread assembly from the first drum 104 and holds it in the similar manner to the second transfer means 141. After the first transfer means 171 holding the belt and tread assembly has been moved away from the first drum 104, the cylinder 111 is actuated to retract its piston rod 112. The first drum 104 is thus retracted laterally from the axis A or forwardly in this embodiment, while the servicer 105 is moved forwardly as well.

Then, the first transfer means 171 and second transfer means 141 are moved along the axis A' to the forming drum 180 in synchronism with each other. At this time, the first drum 104 has been retracted laterally form the axis A' as above described so that the first drum 104 does not interfere with the first and second transfer means 171 and 141. Moreover, the can 208 has been moved forwardly so as to retract from the axis A' as above described, the can 2-8 does not interfere with the first and second transfer means 171 and 141. When the second transfer means 141 has been moved to the location where the axial center of the second transfer means 141 is coincident with the axial center of the forming drum 180, the second transfer means 141 is stopped. At this time, the carcass band G' held by the second transfer means 141 overlaps the forming drum 180 radially outwardly of it. The head D with the filler F is positioned radially outwardly of the bead supports 187 and 188. At this time, moreover, the first transfer means 171 has been stopped between the second transfer means 141 and the can 199.

The bead supports 187 and 188 of the forming drum 180 are then expanded to support the carcass band G' with the filler F on its inside by the bead supports 187 and 188, while the holders 150 of the holding mechanisms 156, 157 and 158 are moved radially outwardly. As a result, the forming drum 180 receives the carcass band G' from the second transfer means 141. After the second transfer means 141 is then moved along the axis A' to the intersection C, the second transfer means 141 is turned through 90° so as to return into its second position. Thereafter, the first transfer means 171 holding the belt and tread assembly on its outside is moved to a location where the first transfer means 171 overlaps the axial center of the forming drum 180, while the cylinder 210 is actuated to extend its piston rod 211 to move the can 208 rearwardly until its axis becomes coaxial to the axis A'.

Then, only the main shaft 179 of the building machine 176 is rotated by the driving means 177 to move the bead supports 187 and 188 in the axial direction toward each other, while air is filled between the forming drum 180 and the carcass band G' so that the carcass band G' is shaped into a toroidal form. At this time, the bladders 189 and 190 are filled with the air so as to expand, while the rodless cylinders 197 and 206 are actuated to move the sliders 198 and 207 toward each other so that the bladders 190 and 189 are urged against the carcass band G' by the cans 199 and 208. In this manner, both the axial ends of the carcass band G' are folded or turned up about the beads D. Moreover, as the carcass band G' is shaped into the toroidal form, the outer circumference of the carcass G' at its axial center is pressed to the inner circumference of the belt and tread assembly so that the belt tread assebly is attached to the outside of the carcass band G' to form a green tire.

Then, the bladders 189 and 190 are contracted, while cans 199 and 208 are moved away from each other. Moreover, the can 208 is retracted forwardly from the axis A', while the first transfer means 171 is moved to the intersection C and returned to its initial position. The hollow shaft 178, the main shaft 179 and the toroidal green tire are then rotated in unison by the driving means 177, while the tread, the sidewalls and the like of the green tire are stitched by the stitching mechanism 216. After the bead supports 187 and 188 have been contracted, the green tire is removed from the forming drum 180 and transferred to a next process by means of a loader (not shown). Moreover, the first building machine 101 and the servicer 105 are moved forwardly, and the first building drum 101 is arranged on the axis A'. The above operation is one cycle of the operation of the embodiment. Thereafter, this cycle is repeated to form green tires one at a time.

FIG. 13 illustrates another embodiment of the invention. In this embodiment, a building machine 176, a cans 199 and 208 and a stitching mechanism 216 are arranged on the left side of the intersection C as viewed in FIG. 13. As a result, it is not needed to move the first building machine 101 and the servicer 105 forwardly and rearwardly, so that the entire apparatus is simplified in construction and small-sized. In this embodiment, moreover, after the carcass band G' has been transferred form a second transfer means 141 to a forming drum 180, the second transfer means 241 is moved into the proximity of the can 199 and awaits thereat. Other constructions and operations are similar to those of the preceding embodiment.

FIG. 14 illustrates a further embodiment of the invention. In this embodiment, a first drum 220 for laminating belts and a tread to form a belt and tread assembly is arranged such that an axis L of the first drum 220 is substantially perpendicular to an axis K of a second drum 221 for forming a carcass band G' and the first drum 220 is movable on the axis L toward an intersection M of the axes K and L. Moreover, a servicer 222 is arranged forwardly of the first drum 220, and a servicer 223 is arranged on the left side of the second drum 221.

A first transfer means 224 is movable along the axis K of the second drum 221 and is rotated between a first position where the first transfer means 224 is on the intersection M and its axis is coaxial to the axis L of the first drum 220 and a second position where the axis of the first transfer means 224 is coaxial to the axis K of the second drum 221. The first transfer means 224 in the first position receives the belt and tread assembly from the first drum 220 and holds it. A second transfer means 225 is arranged on the axis K between the first transfer means 224 and second drum 221 and movable along the axis K. The second transfer means 225 receives the carcass band G formed at the second drum 221 and holds it.

A forming drum 231 is arranged on the axis X remote from and forwardly of the intersection M. In this manner, the second drum 221 is arranged on one side or rearwardly of the intersection K, while the forming drum 231 is arranged on the other side or forwardly of the intersection K. Moreover, the forming drum 231 performs the shaping the carcass band G' received from the second transfer means 225 into the toroidal form and attaching the belt and tread assembly held by the first transfer means 224 onto the outside of the carcass band G' of form a green tire. Cans 232 and 233 are arranged on the axis of the forming drum 231 forwardly and rearwardly thereof for urging bladders of the forming drum 231 against the carcass band G' to hold or turn up both axial ends of the carcass band G' about beads. The can 232 can be retracted laterally or onto the left side of the axis K as viewed in FIG. 14. A stitching mechanism 234 stitches sidewalls and tread of the green tire.

In this embodiment, the delivery of the carcass band G is effected after the second transfer means 225 has been moved to the second drum 221. Moreover, the delivery of the belt and tread assembly is effected after the first drum 220 has been moved to the first transfer means 224 which has been positioned in the first position on the intersection M. After this delivery of the belt and tread assembly, the first transfer means 224 is rotated from the first position to the second position. Then, the first and second transfer means 224 and 225 are moved together along the axis K to the forming drum 231. Other constructions and operations of the apparatus in this embodiment are similar to those of the embodiment shown in FIG. 7.

As can be seen from the above description, the apparatus according to the invention can ease the labor of operators and improve the working efficiency and further achieves the saving energy and the improvement of formed accuracy.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A tire building machine comprising; a first drum for forming a belt and tread assembly by laminating a belt and a tread, a second drum for forming a carcass band and arranged with its axis at an angle within a range of 60°–120° between the axes of the first drum and the second drum and movable to an intersection of the axes, first transfer means movable along the axis of the first drum for receiving the belt and tread assembly from the first drum and holding it, second transfer means movable along the axis of the first drum and rotatable at said intersection between first and second positions where an axis of the second transfer means is coaxial to axes of the first and second drums, respectively, for receiving the carcass band from the second drum and holding it, and a forming drum arranged on the axis of the first drum and remote from said intersection for shaping the carcass band received from the second transfer means into a toroidal form and attaching the belt and tread assembly held by the first transfer means onto an outside of the carcass band to form a green tire.

2. A tire building machine as set forth in claim 1, wherein said forming drum is provided at both axial ends with expansible and contractible bladders and cans are provided at both axial outsides of the forming drum for urging the bladders against the toroidal carcass band to turn up both axial ends of the carcass band about the beads, one of the cans being positioned between the intersection and the forming drum being laterally retractable from an axis of the forming drum, thereby avoiding any interference of the can with said first and second transfer means.

3. A tire building machine as set forth in claim 1, wherein said first drum is arranged between the intersection and the forming drum and made laterally retractable, thereby avoiding any interference of the first drum with the first and second transfer means.

4. A tire building machine as set forth in claim 1, wherein said second transfer means comprises a trolley slidably movable along the axis of the first drum and a rotative frame rotatably supported by the trolley.

5. A tire building machine as set forth in claim 1, wherein said first drum, said first transfer means and said forming drum are arranged on one side of said intersection.

6. A tire building machine as set forth in claim 1, wherein said first drum and said first transfer means are arranged on one side and said forming drum is arranged on the other side of the intersection.

7. A tire building machine as set forth in claim 1, wherein said intersection is arranged between the forming drum and the first drum and the first drum is not laterally retractable.

* * * * *